No. 609,955. Patented Aug. 30, 1898.
A. W. BRIGHTMORE.
STEERING MECHANISM FOR MOTOR VEHICLES.
(Application filed Dec. 31, 1897.)
(No Model.) 2 Sheets—Sheet 1.
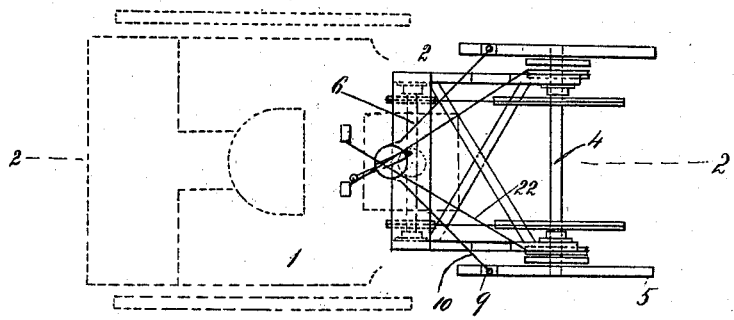
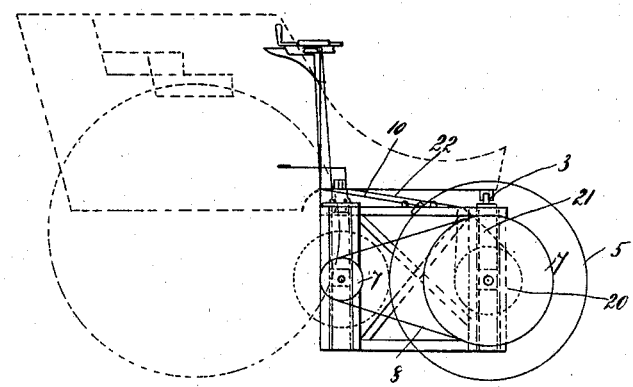
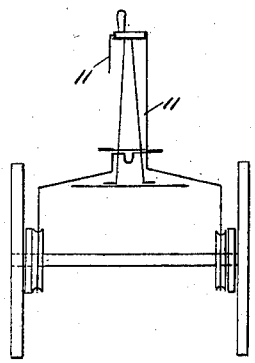

No. 609,955. Patented Aug. 30, 1898.
A. W. BRIGHTMORE.
STEERING MECHANISM FOR MOTOR VEHICLES.
(Application filed Dec. 31, 1897.)
(No Model.) 2 Sheets—Sheet 2.
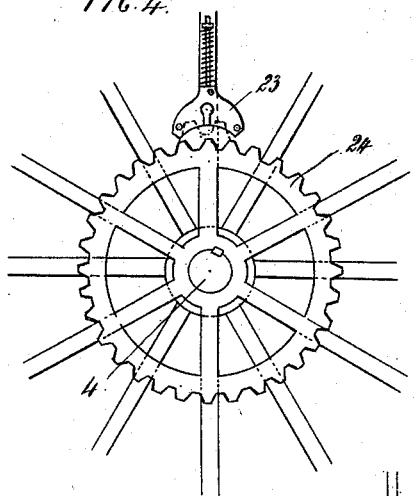
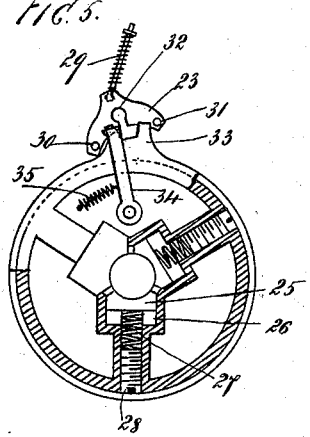
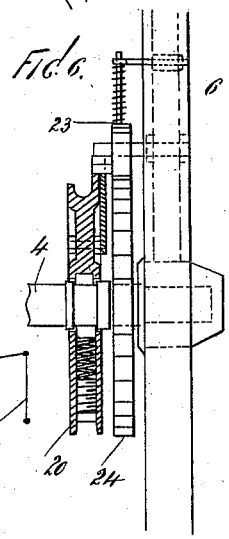
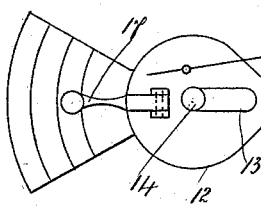
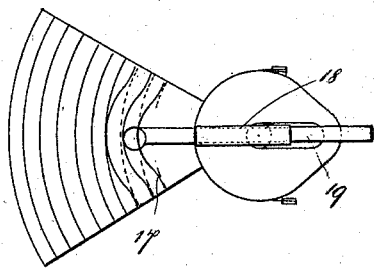

UNITED STATES PATENT OFFICE.

ARTHUR WILLIAM BRIGHTMORE, OF KNIGHTON, ENGLAND.

STEERING MECHANISM FOR MOTOR-VEHICLES.

SPECIFICATION forming part of Letters Patent No. 609,955, dated August 30, 1898.

Application filed December 31, 1897. Serial No. 664,913. (No model.) Patented in England March 20, 1897, No. 7,250.

*To all whom it may concern:*

Be it known that I, ARTHUR WILLIAM BRIGHTMORE, a subject of the Queen of Great Britain, residing at Knighton, in the county of Radnor, Wales, Kingdom of Great Britain, have invented certain new and useful Improvements in Steering Mechanism for Motor-Vehicles, (for which I have obtained a patent in Great Britain, No. 7,250, dated March 20, 1897,) of which the following is a full and complete specification, such as will enable those skilled in the art to which it appertains to make and use the same.

This invention has reference to steering devices for vehicles, and is especially applicable to motor-vehicles in which the power is applied to the front or steering wheels.

The object of the invention is to provide means for steering a vehicle with or without employing the momentum thereof.

To these and other useful ends the invention consists in the features of construction and combinations of parts hereinafter fully described and specifically claimed.

In the drawings forming part of this specification the separate parts of my improvement are designated by the same numerals of reference in each of the views, and in which—

Figure 1 is a plan showing the motor-frame, steering-wheels, and steering mechanism. Fig. 2 is a vertical section on the line 2 2 of Fig. 1. Fig. 3 is a front elevation with certain parts omitted for clearness. Fig. 4 is a view of the ratchet-wheels and double pawl. Fig. 5 is a view of the brake-pulley and double pawl. Fig. 6 is a vertical section through the same with the driving-wheel and ratchet-wheel in elevation. Fig. 7 is a plan of the pulley for regulating a supply of propelling medium or fluid and for applying the brake-shoes, and Fig. 8 is a similar view showing the construction when an electric motor is employed.

Referring to Figs. 1 and 2, 1 indicates the body of the vehicle, and 2 the motor-frame, swiveled thereto. The front end of the body overlaps the motor-frame and has a roller-bearing 3. The axle 4 of the steering-wheels 5 has suitable bearings in the motor-frame, which may be spring-supported. The motor may work directly upon the axle 4 if it does not work quickly or indirectly through a shaft 6 with a quick-acting motor. In the latter case suitable gears 7 and chain or belt connection 8 can be employed. The pin forming the swivel connection between the body and motor-frame is hollow and can serve as a passage for conveying fluid to the motor or through which wires may pass.

The wheels 5 turn loosely upon axle 4, except when held by a pawl-and-ratchet connection between these parts that acts in both directions and which will be described in detail hereinafter. For steering the vehicle when the application of momentum is available brakes 9, which engage the wheels 5, are employed. The said brakes are carried by levers 10, pivoted upon the motor-frame, with their inner ends adjacent and provided with cords 11, that are connected with a rotatable pulley 12, by means of which either of the brakes can be applied. As shown in Figs. 7 and 8, this pulley 12 is provided with a slot 13, receiving its pivot 14, so that the pulley can be removed to the rear to apply both brakes at once. The construction shown in Fig. 7 is adapted for use with a fluid-motor, and a rod 15 is pivoted to the pulley 12 and to a lever 16, controlling the fluid-supply. When the handle 17 is turned in either direction, the fluid-supply is decreased with the application of the brakes, and as the pulley 12 is moved to the rear to apply both brakes the fluid-supply is reduced and finally cut off. The parts are so arranged, however, that the pulley may be turned when in this latter position to decrease the application of either brake without turning on the fluid-supply.

The construction shown in Fig. 8 is used when electricity is employed. The pulley is provided with a sleeve 18, and the handle 17 has a rod 19 sliding therein. The handle can thus be moved to make the various electrical connections without applying both brakes until the rod 19 has been withdrawn to its full extent. It is noted, however, that the pulley can be turned to apply the brakes 9, as above described, at the same time diminishing the current when necessary. It is seen from the above description that by turning the handle 17 to the right, for instance, the left-hand cord 11 is wound thereon to apply its brake. The brake being applied to the left-hand steering-wheel, the momentum of the vehicle causes it to steer to the left.

When the momentum is not available for steering, the brake-pulleys 20, fastened to the axle 4, are employed. Brake-bands 21 pass around said pulleys, having their ends connected with the motor-frame and with levers 22, that extend to the rear and cross, so that their ends are situated to correspond in steering the vehicle with the direction in which the handle 17 is moved.

The pawl-and-ratchet connection between the wheels 5 and axle 4 embodies conveniently the location of double pawls 23 upon the wheels 5 and ratchet-wheels 24 upon the axle. The double prongs of the pawl serve to act in propelling the wheel in opposite directions, as is obvious. The brake-pulley 20 is fastened upon the axle 4 by friction devices that cause said pulley to normally rotate therewith, while friction from the pulley-band causes a relative movement of said parts. The particular construction comprises a plurality of bearing-blocks 25 within suitable sockets 26 in the hub of the pulley, that are held against the axle 7 by springs 27, held under adjustable tension by set-screws 28 in the screw-threaded sockets shown.

The pawl 23 is pivoted to the wheel 5 and has a spring 29 for throwing it to either side, while on its side adjacent the pulley it is provided with pins 30 and 31 and a central projection 32. The pulley is provided with a cam 33, between which the projection 32 is situated. The double-horned cam on the rim of the pulley has its forward horns shaped to catch and hold the pin 30 when the latter mounts that side of the cam when the brake-cord is not applied to the pulley. When the brake-cord is applied, the pin 30 moves the arm 34 against the spring 35, and the cam moves over into its backward position.

In the notch in the center of the cam the arm between the pawls moves, and by this or similar means when the motor starts forward the "forward" pawls are pressed into contact with the ratchet-wheels, and when the motor starts backward the "backward" pawls are similarly engaged. The cams attached to the pulley lie between the pins on the pawls, so that when the brake-strap on one of the pulleys is applied and the wheel gains upon the pulley the forward pawl climbs one horn of the cam, which causes that pawl to become disengaged, so that the axle no longer drives that wheel of the vehicle. In this way the vehicle can be steered. The pawls on both sides of the vehicle may similarly disengage themselves for running downhill, steering being effected by the wheel-brakes, as described, the motor fluid or electricity being for the time disconnected. The horn on the forward side of the cam of the pulley is held in position by the spring shown, so that if it is desired to make the wheels work the motor going down steep hills the pulley-brakes are applied and the backward pawl is caused to engage, the pin being able to pass the horn when the latter is moved against the spring. When the reversing-lever or its equivalent is used, the backward pawls engage the ratchet-wheels and the steering is effected by the pulley-brakes. The pawls are held in position when engaged with the ratchet-wheels by means of the pressure exerted on the central arms by the cams on the pulleys; but for an additional security springs may also be used for this purpose.

Having fully described my invention, I claim as new and desire to secure by Letters Patent—

1. In a motor-vehicle, the steering-wheels, the motor for driving the same, brakes for said wheels, means for operating said brakes, and means for regulating the speed of the motor simultaneously with the operation of the brakes, said means operating independently of the speed of the motor.

2. In a motor-vehicle, the steering-wheels, the motor for driving the same, brakes for said wheels, and means for simultaneously applying said brakes and for controlling the supply of propelling medium to said motor.

3. In a motor-vehicle, the steering-wheels, the motor for driving the same, brakes for said wheels, and an operating-lever connected with said brakes and controlling the supply of propelling medium to the motor, said parts being arranged to effect the regulation of the motor when either or both brakes are applied.

4. In a motor-vehicle, the steering-wheels mounted to rotate upon an axle, a ratchet-wheel and double pawls connecting said parts, and a motor for driving said axle.

5. In a motor-vehicle, the steering-wheels mounted to rotate upon an axle, a double pawl carried by said wheels, a toothed wheel fast upon said axle, and a brake-pulley having frictional engagement with said axle and controlling the movement of said pawl.

6. In a motor-vehicle, the steering-wheels mounted to rotate upon an axle, double pawls carried by said wheels, toothed wheels fast upon said axle, brake-pulleys having frictional engagement with said axle and having cams to control the movement of said double pawls, and brake bands and levers.

7. In a motor-vehicle, the steering-wheels mounted to rotate upon an axle, double pawls carried by said wheels, and having end and central projections, toothed wheels fast upon said axle, brake-pulleys having frictional engagement therewith, double-horned cams upon said brake-pulley, notches in said cams to receive the center projections of said pawls, and brake bands and levers.

In testimony that I claim the foregoing as my invention I have signed my name, in presence of the subscribing witnesses, this 20th day of December, 1897.

ARTHUR WILLIAM BRIGHTMORE.

Witnesses:
EDWARD GEORGE SANDFORD CORSER,
ARTHUR SANDFORD CORSER.